(12) United States Patent
DeVolder

(10) Patent No.: US 11,186,751 B2
(45) Date of Patent: Nov. 30, 2021

(54) MULTILAYER PSA FOAM PARTICLES

(71) Applicant: 3M INNOVATIVE PROPERTIES COMPANY, St. Paul, MN (US)

(72) Inventor: Ross J. DeVolder, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 150 days.

(21) Appl. No.: 16/608,213

(22) PCT Filed: Apr. 26, 2018

(86) PCT No.: PCT/US2018/029501
§ 371 (c)(1),
(2) Date: Oct. 25, 2019

(87) PCT Pub. No.: WO2018/200764
PCT Pub. Date: Nov. 1, 2018

(65) Prior Publication Data
US 2020/0190368 A1    Jun. 18, 2020

Related U.S. Application Data

(60) Provisional application No. 62/491,534, filed on Apr. 28, 2017.

(51) Int. Cl.
*C09J 7/38* (2018.01)
*B32B 7/12* (2006.01)
(Continued)

(52) U.S. Cl.
CPC .............. *C09J 7/381* (2018.01); *B32B 7/12* (2013.01); *B32B 27/32* (2013.01); *B32B 27/40* (2013.01);
(Continued)

(58) Field of Classification Search
None
See application file for complete search history.

(56) References Cited

U.S. PATENT DOCUMENTS

| 3,645,837 A | 2/1972 | Chisholm |
| 3,876,707 A | 4/1975 | Menet |

(Continued)

FOREIGN PATENT DOCUMENTS

| EP | 2423285 | 2/2012 |
| WO | WO 1995-032851 | 12/1995 |

(Continued)

OTHER PUBLICATIONS

International Search Report for PCT International Application No. PCT/US2018/029501, dated Jul. 19, 2018, 4 pages.

(Continued)

*Primary Examiner* — Chinessa T. Golden

(57) ABSTRACT

Unified multilayer articles comprising alternating layers including: a) at least two elastomeric foam interior layers, which are interior layers of the unified multilayer article, and which comprise: i) a first elastomeric material, and distributed therein: ii) expanded polymeric microspheres; where the elastomeric foam interior layers alternate with: b) at least two alternate layers directly bound to adjacent elastomeric foam interior layers; and wherein at least one of the alternate layers is an interior layer of the unified multilayer article. Adhesive films comprising the unified multilayer articles of the present disclosure are also provided, which additionally comprises at least one pressure sensitive adhesive attachment layer, which is an outermost PSA layer directly bound to a first face of the unified multilayer article and available for attachment of the adhesive film to an adherend.

22 Claims, 2 Drawing Sheets

(51) Int. Cl.
　　*B32B 27/32*　　(2006.01)
　　*B32B 27/40*　　(2006.01)
　　*C09J 9/00*　　(2006.01)
　　*C09J 123/00*　　(2006.01)
　　*C09J 175/04*　　(2006.01)

(52) U.S. Cl.
　　CPC .............. *C09J 9/00* (2013.01); *C09J 123/00* (2013.01); *C09J 175/04* (2013.01); *C09J 2301/208* (2020.08); *C09J 2301/302* (2020.08)

(56) References Cited

U.S. PATENT DOCUMENTS

| | | |
|---|---|---|
| 4,894,259 A * | 1/1990 | Kuller .................. C09J 7/38 427/208.8 |
| 4,906,421 A | 3/1990 | Plamthottam |
| 5,476,712 A * | 12/1995 | Hartman ................ B29C 44/24 428/317.3 |
| 5,604,019 A | 2/1997 | Bland |
| 5,660,922 A | 8/1997 | Herridge |
| 5,804,610 A | 9/1998 | Hamer |
| 6,045,895 A | 4/2000 | Hyde |
| 6,103,152 A | 8/2000 | Gehlsen |
| 6,527,899 B1 | 3/2003 | Dietz |
| 6,579,601 B2 | 6/2003 | Kollaja |
| 6,727,002 B2 | 4/2004 | Hoch |
| 6,842,288 B1 | 1/2005 | Liu |
| 7,255,914 B2 | 8/2007 | Shirk |
| 7,993,739 B2 | 8/2011 | Barger |
| 9,200,129 B2 | 12/2015 | Czerwonatis |
| 10,435,594 B2 | 10/2019 | Blazejewski |
| 2004/0175656 A1 | 9/2004 | Baer |
| 2009/0084787 A1 | 4/2009 | Ikenoya |
| 2015/0030839 A1 | 1/2015 | Satrijo |

FOREIGN PATENT DOCUMENTS

| | | |
|---|---|---|
| WO | WO 2003-066766 | 8/2003 |
| WO | WO 2018-109605 | 6/2018 |

OTHER PUBLICATIONS

Wenbin Liang, Xiaojie Sun, and Shih-Yaw Lai, "The structural and acoustic properties of polyolefin foam/film multilayer materials", © 2015 Society of Plastics Engineers (SPE).

* cited by examiner

MULTILAYER PSA FOAM PARTICLES

CROSS REFERENCE TO RELATED APPLICATIONS

This application is a national stage filing under 35 U.S.C. 371 of PCT/US2018/029501, filed Apr. 26, 2018, which claims the benefit of U.S. Provisional Application No. 62/491,534, filed Apr. 28, 2017, the disclosure of which is incorporated by reference in its entirety herein.

FIELD OF THE DISCLOSURE

This disclosure relates to multilayer pressure sensitive adhesive (PSA) foam articles comprising layers of PSA foam alternating with alternate layers, as well as adhesive films comprising such multilayer PSA foam articles.

BACKGROUND OF THE DISCLOSURE

The following references may be relevant to the general field of technology of the present disclosure: International Application PCT/IB2017/057554 based on U.S. Pat. App. No. 62/433,014 filed Dec. 12, 2016; U.S. Pat. Nos. 6,103,152; 9,200,129; 6,527,899; 5,660,922; 6,045,895; 3,645,837; 4,906,421; 6,579,601; 7,993,739; 3,876,707; 5,604,019; 6,727,002; 6,842,288; 7,255,914; US 2004/0175656; US 2009/0084787; EP 3075772; EP 2423285; Wenbin Liang, Xiaojie Sun, and Shih-Yaw Lai, "The structural and acoustic properties of polyolefin foam/film multilayer materials", Society of Plastics Engineers Plastics Research Online, Apr. 8, 2015.

SUMMARY OF THE DISCLOSURE

Briefly, the present disclosure provides a unified multilayer article comprising alternating layers including: a) at least two elastomeric foam interior layers, which are interior layers of the unified multilayer article, and which comprise: i) a first elastomeric material, and distributed therein: ii) expanded polymeric microspheres; where the elastomeric foam interior layers alternate with: b) at least two alternate layers directly bound to adjacent elastomeric foam interior layers; and wherein at least one of the alternate layers is an interior layer of the unified multilayer article. Additional embodiments of the multilayer article of the present disclosure are described below under "Selected Embodiments."

In another aspect, the present disclosure provides an adhesive film comprising the unified multilayer article of the present disclosure, which additionally comprises a first PSA attachment layer, which is an outermost PSA layer directly bound to a first face of the unified multilayer article and available for attachment of the adhesive film to an adherend. Additional embodiments of the adhesive film of the present disclosure are described below under "Selected Embodiments."

The preceding summary of the present disclosure is not intended to describe each embodiment of the present invention. The details of one or more embodiments of the invention are also set forth in the description below. Other features, objects, and advantages of the invention will be apparent from the description and from the claims.

In this application:

"interior layer" means, with regard to layers of a multilayer article, a layer other than either of the outermost layers of the multilayer article (i.e., those comprising the faces of the multilayer article), it being understood that this definition contemplates that portions of an "interior layer" may be exposed at the edge of a multilayer article or through small gaps in an outermost layer;

"directly bound" means, with regard to layers of a multilayer article, that the layers contact each other without any intervening matter and are bound together without any intervening matter;

"indirectly bound" means, with regard to layers of a multilayer article, that the layers are bound through an intervening layer to which each is directly bound, or the layers are bound through a plurality of intervening layers directly bound to each other, to which each is directly bound;

"unified" means, with regard to a multilayer article, that the layers thereof are directly or indirectly bound and not designed to be separated or delaminated as would, e.g., a pressure sensitive adhesive tape in roll form;

"elastomeric" means materials that display low storage modulus and long strain to break, typically having a storage modulus at 1 Hz and room temperature of less than 1.2 MPa or more typically less than 1.0 MPa, and typically having strain to break of at least 100%;

"pressure sensitive adhesive (PSA)" means materials having the following properties: a) aggressive and permanent tack, b) the ability to adhere with no more than finger pressure, c) the ability to adhere without activation by any energy source, d) sufficient ability to hold onto the intended adherend, and preferably e) sufficient cohesive strength to be removed cleanly from the adherend; which materials typically meet the Dahlquist criterion of having a storage modulus at 1 Hz and room temperature of less than 0.31 MPa; and "substituted" means, for a chemical species, group or moiety, substituted by conventional substituents which do not interfere with the desired product or process, e.g., substituents can be alkyl, alkoxy, aryl, phenyl, halo (F, Cl, Br, I), cyano, nitro, etc.

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

Figure 1:
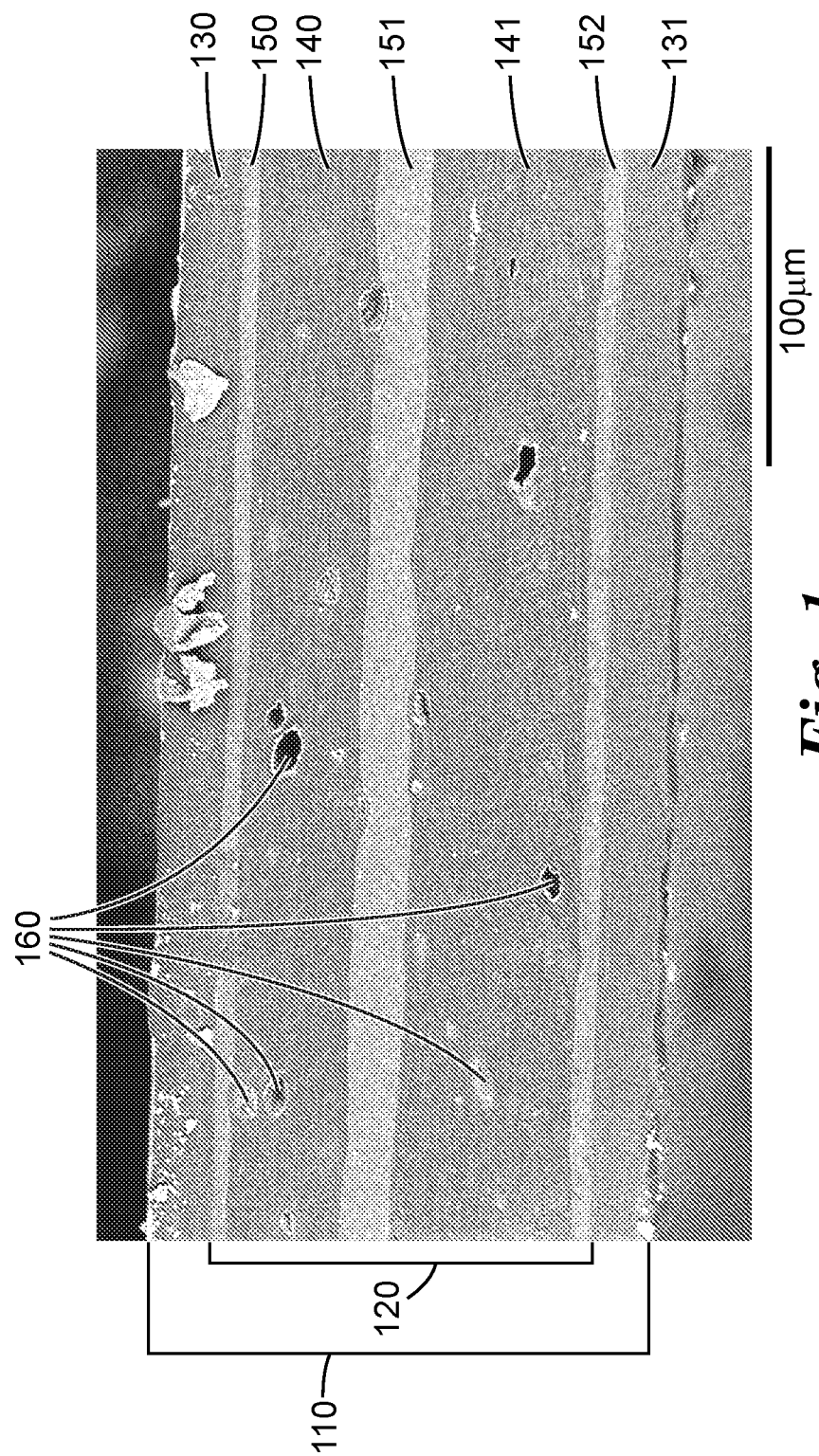
FIG. 1 is a micrograph of a cross-section of an adhesive film comprising a 5-layer multilayer film, according to one embodiment of the present disclosure, described herein as Ex. 19, with a scale bar indicating 100 microns.

The present disclosure provides a unified multilayer article comprising alternating layers including: a) at two elastomeric foam interior layers, which are interior layers of the unified multilayer article, and which comprise: i) a first elastomeric material, and distributed therein: ii) expanded polymeric microspheres; where the elastomeric foam interior layers alternate with: b) at least two alternate layers directly bound to adjacent elastomeric foam interior layers; and wherein at least one of the alternate layers is an interior layer of the unified multilayer article. The present disclosure additionally provides an adhesive film comprising the unified multilayer article of the present disclosure, which additionally comprises a first PSA attachment layer, which is an outermost PSA layer directly bound to a first face of the unified multilayer article and available for attachment of the adhesive film to an adherend.

In general, foam layers of the present disclosure are foams due to the inclusion of expanded polymeric microspheres and are thus syntactic foams. In some embodiments, foam layers of the present disclosure may additionally comprise chemical blowing agents, and may therefore be hybrid syntactic/non-syntactic foams. In some embodiments, foam layers of the present disclosure comprise no chemical blowing agents and are therefore exclusively syntactic foams. In some embodiments, the expanded polymeric microspheres are derived from heat-expandable polymeric microspheres. In some embodiments, the heat-expandable polymeric microspheres expand at a temperature of less than 250° C., in some less than 200° C., in some less than 170° C., in some less than 150° C. and in some less than 130° C.

Any suitable elastomeric materials may be used. In some embodiments, elastomeric materials are selected from (meth)acrylate polymers, natural or synthetic rubbers, silicones, block copolymer-based elastomers (such as diblock copolymers, triblock copolymers, or star block copolymers, any of which may include styrenic blocks) and combinations thereof. In some embodiments, elastomeric materials may include one or more tackifiers or may exclude tackifiers. In some embodiments, elastomeric materials may include one or more plasticizers or may exclude plasticizers. In some embodiments, elastomeric materials are (meth)acrylate polymers. In some embodiments, elastomeric materials are block copolymer-based elastomers. In some embodiments, elastomeric materials are blends of (meth)acrylate polymers and block copolymer-based elastomers.

In some embodiments, elastomeric foam layers may additionally contain one or more suitable additives. Exemplary additives usable herein include crosslinking agents (e.g., polyisocyanate compounds, silicone compounds, epoxy compounds, and alkyl-etherified melamine compounds), surfactants, plasticizers, nucleating agents (e.g., talc, silica, or $TiO_2$), fillers (e.g., glass or polymeric low-density microspheres), fibers, age inhibitors, antioxidants, ultraviolet-absorbers, antistatic agents, lubricants, pigments, dyes, reinforcing agents, hydrophobic or hydrophilic silica, calcium carbonate, toughening agents, flame retardants, finely ground polymeric particles (e.g., polyester, nylon, or polypropylene), stabilizers (e.g., UV stabilizers), colorants (e.g., dyes and pigments such as carbon black), and combinations thereof.

Alternate layers may be of any suitable material. In some embodiments, each alternate layer is a single layer having a single composition. In some embodiments, alternate layers differ in composition. In some embodiments, alternate layers may comprise multiple sublayers. Alternate layers are typically non-foamed layers, however, in some embodiments one or more alternate layers may be syntactic or non-syntactic foamed layers.

In some embodiments, alternate layers comprise a material having a room temperature Young's Modulus of greater than 0.9 MPa, in some greater than 1.2 MPa, in some greater than 2.0 MPa, in some greater than 4.0 MPa, and in some greater than 6.0 MPa. Measured Shore A and Shore D hardness values of polymeric materials may be used to calculate an estimated Young's modulus according to the following empirical formulas:

$$((\text{Shore } A \text{ hardness} \times 0.0235) - 0.6403)^{2.72} = \text{Young's modulus in MPa}.$$

$$(((\text{Shore } D \text{ hardness} + 50) \times 0.0235) - 0.6403)^{2.72} = \text{Young's modulus in MPa}.$$

In some embodiments, alternate layers comprise a material having a Young's Modulus higher than that of the first elastomeric material. Without wishing to be bound by theory, it is believed that the addition of alternate layers having higher modulus contribute to convertibility of the unified multilayer article. Alternate layers typically comprise thermoplastic materials. In some embodiments, alternate layers comprise a material having a melting point greater than 140° F. (60° C.), in some greater than 150° F. (66° C.), and in some greater than 160° F. (71° C.). Suitable materials may include polyurethanes, polyesters (such as PET), poly(meth)acrylates, polyolefins such as polyethylenes (including HDPE), and any combination of the above, any of which may be substituted or unsubstituted.

In some embodiments, alternate layers may additionally contain one or more suitable additives. Exemplary additives usable herein include crosslinking agents (e.g., polyisocyanate compounds, silicone compounds, epoxy compounds, and alkyl-etherified melamine compounds), surfactants, plasticizers, nucleating agents (e.g., talc, silica, or $TiO_2$), fillers (e.g., glass or polymeric low-density microspheres), fibers, age inhibitors, antioxidants, ultraviolet-absorbers, antistatic agents, lubricants, pigments, dyes, reinforcing agents, hydrophobic or hydrophilic silica, calcium carbonate, toughening agents, flame retardants, finely ground polymeric particles (e.g., polyester, nylon, or polypropylene), stabilizers (e.g., UV stabilizers), colorants (e.g., dyes and pigments such as carbon black), and combinations thereof.

In some embodiments, the elastomeric material of the elastomeric foam layers is oriented polymer. In some embodiments, the alternate layers are oriented polymer. In some embodiments, all the elastomeric material and alternate layers of the unified multilayer article are oriented. In some such embodiments all of the elastomeric material and alternate layers of the unified multilayer article are oriented in the same direction.

The present disclosure additionally contemplates adhesive films comprising the present unified multilayer articles and one or more pressure sensitive adhesive (PSA) attachment layers. Any suitable PSA materials may be used. Exemplary pressure-sensitive adhesive materials include, but are not limited to, acrylic pressure-sensitive adhesives, rubber pressure-sensitive adhesives, rubber-resin pressure-sensitive adhesives, silicone pressure-sensitive adhesives, block copolymer-based pressure-sensitive adhesives and other known pressure-sensitive adhesives. Most typically, acrylic pressure-sensitive adhesives are used. The pressure-sensitive adhesives listed above may be used alone or in combination. In various embodiments, PSA's may include emulsion pressure-sensitive adhesives, solvent-borne pressure-sensitive adhesives, photo-polymerizable pressure-sensitive adhesives and hot melt processed pressure-sensitive adhesives (i.e., hot melt extruded pressure-sensitive adhesives).

Acrylic pressure-sensitive adhesives include pressure-sensitive adhesives containing an acrylic polymer as a base polymer (or base resin). Though not so limited, the acrylic polymer can be prepared by polymerizing (or copolymerizing) monomers which may include one or more alkyl (meth)acrylates and/or one or more monomers copolymerizable with the alkyl (meth)acrylates, such as polar-group-containing monomers or multifunctional monomers. The polymerization can be performed, without limitation, according to any technique known in the art, such as ultraviolet polymerization, solution polymerization, or emulsion polymerization. Alkyl (meth)acrylates for use monomer components of the acrylic polymer herein may include alkyl (meth)acrylates having linear or branched-chain alkyl groups, examples including alkyl (meth)acrylates whose alkyl moiety has 1 to 20 carbon atoms, such as methyl (meth)acrylates, ethyl (meth)acrylates, propyl (meth)acrylates, isopropyl (meth)acrylates, butyl (meth)acrylates, isobutyl (meth)acrylates, s-butyl (meth)acrylates, t-butyl (meth)acrylates, pentyl (meth)acrylates, isopentyl (meth)acrylates, hexyl (meth)acrylates, heptyl (meth)acrylates, octyl (meth) acrylates, 2-ethylhexyl (meth) acrylates, isooctyl (meth)acrylates, nonyl (meth)acrylates, isononyl (meth)acrylates, decyl (meth)acrylates, isodecyl (meth)acrylates, undecyl (meth)acrylates, dodecyl (meth) acrylates, tridecyl (meth) acrylates, tetradecyl (meth) acrylates, pentadecyl (meth) acrylates, hexadecyl (meth)acrylates, heptadecyl (meth) acrylates, octadecyl (meth)acrylates, nonadecyl (meth)acrylates, and eicosyl (meth)acrylates. Among these, alkyl (meth)acrylates whose alkyl moiety has 2 to 14 carbon atoms are typical, and alkyl (meth)acrylates whose alkyl moiety has 2 to 10 carbon atoms are more typical. The acrylic polymer may further contain, as monomer components, one or more copolymerizable monomers such as polar-group-containing monomers and multifunctional monomers. Exemplary polar-group-containing monomers include carboxyl-containing monomers such as (meth)acrylic acids, itaconic acid, maleic acid, fumaric acid, crotonic acid, and isocrotonic acid, along with anhydrides of them, such as maleic anhydride; hydroxyl-containing monomers including hydroxyalkyl (meth)acrylates such as hydroxyethyl (meth)acrylates, hydroxypropyl (meth) acrylates, and hydroxybutyl (meth)acrylates; amido-containing monomers such as acrylamide, methacrylamide, N,N-dimethyl(meth)acrylamides, N-methylol(meth)acrylamides, N-methoxymethyl(meth)-acrylamides, and N-butoxymethyl (meth)acrylamides; amino-containing monomers such as aminoethyl (meth)acrylates, dimethylaminoethyl (meth)acrylates, and t-butylaminoethyl (meth) acrylates; glycidyl-containing monomers such as glycidyl (meth)acrylates and methylglycidyl (meth)acrylates; cyano-containing monomers such as acrylonitrile and methacrylonitrile; heterocycle-containing vinyl monomers such as N-vinyl-2-pyrrolidone, (meth)acryloylmorpholines, N-vinylpyridine, N-vinylpiperidone, N-vinylpyrimidine, N-vinylpiperazine, N-vinylpyrrole, N-vinylimidazole, N-vinyloxazole, and N-vinylcaprolactam; alkoxyalkyl (meth)acrylate monomers such as methoxyethyl (meth)acrylates and ethoxyethyl (meth)acrylates; sulfo-containing monomers such as sodium vinylsulfonate; phosphate-containing monomers such as 2-hydroxyethylacryloyl phosphate; imido-containing monomers such as cyclohexylmaleimide and isopropylmaleimide; and isocyanate-containing monomers such as 2-methacryloyloxyethyl isocyanate. Of these polar-group-containing monomers, acrylic acid and other carboxyl-containing monomers, and anhydrides thereof, are typical. Examples of multifunctional monomers which may be used in the PSA may include hexanediol di(meth)acrylates, butanediol di(meth)acrylates, (poly)ethylene glycol di(meth)acrylates, (poly)propylene glycol di(meth)acrylates, neopentyl glycol di(meth)acrylates, pentaerythritol di(meth)acrylates, pentaerythritol tri(meth)acrylates, dipentaerythritol hexa(meth)acrylates, trimethyloipropane tri(meth)acrylates, tetramethylolmethane tri(meth)acrylates, allyl (meth)acrylates, vinyl (meth)acrylates, divinylbenzene, epoxy acrylates, polyester acrylates, and urethane acrylates. In addition to the polar-group-containing monomers and multifunctional monomers, exemplary copolymerizable monomers usable herein further include vinyl esters such as vinyl acetate and vinyl propionate; aromatic vinyl compounds such as styrene and vinyltoluene; olefins or dienes such as ethylene, butadiene, isoprene, and isobutylene; vinyl ethers such as vinyl alkyl ethers; and vinyl chloride. Exemplary copolymerizable monomers further include (meth)acrylates each having an alicyclic hydrocarbon group, such as cyclopentyl (meth)acrylates, cyclohexyl (meth)acrylates, and isobornyl (meth)acrylates.

In some embodiments, useful PSA's may further contain one or more tackifiers. Examples of tackifiers include hydrocarbon resins, terpene phenol resins, rosin resins, rosin ester resins, and hydrogenated products thereof. Exemplary tackifiers may include Regalrez"1085, Regalrez"1094, Regalrez'6108, and Regalrez"3102, which are manufactured by Eastman Chemical Japan Ltd., Minato-ku, Tokyo, Japan, and Arkon P-140, which is manufactured by Arakawa Chemical Industries, Ltd., Osaka City, Osaka Prefecture, Japan.

In some embodiments, PSA layers may contain one or more suitable additives. Exemplary additives usable herein include silanes, crosslinking agents (e.g., polyisocyanate compounds, silicone compounds, epoxy compounds, and alkyl-etherified melamine compounds), surfactants, plasticizers (other than physical blowing agents), nucleating agents (e.g., talc, silica, or $TiO_2$), fillers (e.g., glass or polymeric low-density microspheres), fibers, age inhibitors, antioxidants, ultraviolet-absorbers, antistatic agents, lubricants, pigments, dyes, reinforcing agents, hydrophobic or hydrophilic silica, calcium carbonate, toughening agents, flame retardants, finely ground polymeric particles (e.g., polyester, nylon, or polypropylene), stabilizers (e.g., UV stabilizers), colorants (e.g., dyes and pigments such as carbon black), and combinations thereof.

The material of a PSA layer may be the same or different than the elastomeric material of one or more elastomeric foam interior layers of the unified multilayer article. In adhesive films having two PSA layers, the materials of the PSA layers may be the same or may be different.

The unified multilayer articles and adhesive films of the present disclosure may be made by any suitable method. Typically, the unified multilayer articles are made using multilayer extrusion. Typically, very little or no solvent is present in the melt streams, typically less than 5.0 weight percent, more typically less than 1.0 weight percent, and more typically no more than trace amounts. Most typically the melt streams contain no added solvents. As used herein, solvent refers to low molecular weight organic liquids commonly used as solvents in polymer processing. In one such process, materials for separate layers are processes in separate extruders and the extrudate streams are joined in a multilayer feedblock. Expandable microspheres are typically added in later stages of the extruder processing elastomeric foam layer material. In some embodiments, PSA materials of the adhesive films according to the present disclosure are processed simultaneously with the materials of the unified multilayer articles and joined to the materials of the unified multilayer articles by coextrusion through a multilayer feedblock. In other embodiments, PSA layers are formed separately and laminated to unified multilayer articles to form the adhesive films according to the present disclosure.

SELECTED EMBODIMENTS

The following embodiments, designated by letter and number, are intended to further illustrate the present disclosure but should not be construed to unduly limit this disclosure.

F1. A unified multilayer article comprising alternating layers including:
  A. at least two elastomeric foam interior layers, which are interior layers of the unified multilayer article, and which comprise:
    i) a first elastomeric material, and distributed therein
    ii) expanded polymeric microspheres;
  the elastomeric foam interior layers alternating with
  B. at least two alternate layers directly bound to adjacent elastomeric foam interior layers;
wherein at least one of the alternate layers is an interior layer of the unified multilayer article.

F2. The unified multilayer article of embodiment F1, wherein each alternate layer is a single layer having a single composition.

F3. The unified multilayer article of embodiment F1, wherein alternate layers comprises multiple sublayers, each sublayer having the same composition.

F4. The unified multilayer article of embodiment F1, wherein alternate layers comprise multiple sublayers, wherein sublayers vary in composition.

F5. The unified multilayer article of any of the preceding embodiments, wherein the total number of alternate layers is at least three.

F6. The unified multilayer article of any of the preceding embodiments, wherein the total number of elastomeric foam interior layers is at least three.

F7. The unified multilayer article of any of the preceding embodiments, wherein the total number of alternating elastomeric foam interior layers and alternate layers is at least five.

F8. The unified multilayer article of any of the preceding embodiments, wherein the total number of alternating elastomeric foam interior layers and alternate layers is at least seven.

F9. The unified multilayer article of any of the preceding embodiments, wherein the total number of alternating elastomeric foam interior layers and alternate layers is at least nine.

F10. The unified multilayer article of any of the preceding embodiments, wherein the total number of alternating elastomeric foam interior layers and alternate layers is at least eleven.

F11. The unified multilayer article of any of the preceding embodiments, wherein the total number of alternating elastomeric foam interior layers and alternate layers is at least thirteen.

F12. The unified multilayer article of any of the preceding embodiments, wherein alternate layers have an average thickness and elastomeric foam interior layers have an average thickness at least 2 times greater than the alternate layer average thickness.

F13. The unified multilayer article of any of the preceding embodiments, wherein alternate layers have an average thickness and elastomeric foam interior layers have an average thickness at least 2.5 times greater than the alternate layer average thickness.

F14. The unified multilayer article of any of the preceding embodiments, wherein alternate layers have an average thickness and elastomeric foam interior layers have an average thickness at least 3 times greater than the alternate layer average thickness.

F15. The unified multilayer article of any of the preceding embodiments, wherein alternate layers have an average thickness and elastomeric foam interior layers have an average thickness at least 3.5 times greater than the alternate layer average thickness.

F16. The unified multilayer article of any of the preceding embodiments, wherein alternate layers have an average thickness and elastomeric foam interior layers have an average thickness at least 4 times greater than the alternate layer average thickness.

F17. The unified multilayer article of any of the preceding embodiments, wherein elastomeric foam interior layers have a thickness of not more than 100 microns.

F18. The unified multilayer article of any of the preceding embodiments, wherein elastomeric foam interior layers have a thickness of not more than 60 microns.

F19. The unified multilayer article of any of the preceding embodiments, wherein elastomeric foam interior layers have a thickness of not more than 40 microns.

F20. The unified multilayer article of any of the preceding embodiments, wherein elastomeric foam interior layers have a thickness of not more than 30 microns.

F21. The unified multilayer article of any of the preceding embodiments, wherein elastomeric foam interior layers have a thickness of not more than 22 microns.

F22. The unified multilayer article of any of the preceding embodiments, wherein alternate layers have a thickness of not more than 100 microns.

F23. The unified multilayer article of any of the preceding embodiments, wherein alternate layers have a thickness of not more than 40 microns.

F24. The unified multilayer article of any of the preceding embodiments, wherein alternate layers have a thickness of not more than 20 microns.

F25. The unified multilayer article of any of the preceding embodiments, wherein alternate layers have a thickness of not more than 10 microns.

F26. The unified multilayer article of any of the preceding embodiments, wherein alternate layers have a thickness of not more than 5 microns.

F27. The unified multilayer article of any of the preceding embodiments having a thickness of not more than 1000 microns.

F28. The unified multilayer article of any of the preceding embodiments having a thickness of not more than 500 microns.

F29. The unified multilayer article of any of the preceding embodiments having a thickness of not more than 300 microns.

F30. The unified multilayer article of any of the preceding embodiments having a thickness of not more than 200 microns.

F31. The unified multilayer article of any of the preceding embodiments having a thickness of not more than 150 microns.

F32. The unified multilayer article of any of the preceding embodiments having a thickness of not more than 130 microns.

F33. The unified multilayer article of any of the preceding embodiments having a thickness of not more than 120 microns.
F34. The unified multilayer article of any of the preceding embodiments having a thickness of not more than 110 microns.
F35. The unified multilayer article of any of the preceding embodiments having a thickness of not more than 100 microns.
F36. The unified multilayer article of any of the preceding embodiments having a thickness of not more than 90 microns.
F37. The unified multilayer article of any of the preceding embodiments wherein the expanded polymeric microspheres have an average diameter of not more than 120 microns.
F38. The unified multilayer article of any of the preceding embodiments wherein the expanded polymeric microspheres have an average diameter of not more than 70 microns.
F39. The unified multilayer article of any of the preceding embodiments wherein the expanded polymeric microspheres have an average diameter of not more than 45 microns.
F40. The unified multilayer article of any of the preceding embodiments wherein the expanded polymeric microspheres have an average diameter of not more than 22 microns.
F41. The unified multilayer article of any of the preceding embodiments wherein the expanded polymeric microspheres are derived from heat-expandable polymeric microspheres.
F42. The unified multilayer article of any of the preceding embodiments wherein the expanded polymeric microspheres are derived from heat-expandable polymeric microspheres which expand at a temperature of less than 130° C.
F43. The unified multilayer article of any of the preceding embodiments wherein the expanded polymeric microspheres are derived from heat-expandable polymeric microspheres which expand at a temperature of less than 150° C.
F44. The unified multilayer article of any of the preceding embodiments wherein the expanded polymeric microspheres are derived from heat-expandable polymeric microspheres which expand at a temperature of less than 170° C.
F45. The unified multilayer article of any of the preceding embodiments wherein the expanded polymeric microspheres are derived from heat-expandable polymeric microspheres which expand at a temperature of less than 200° C.
F46. The unified multilayer article of any of the preceding embodiments wherein the expanded polymeric microspheres are derived from heat-expandable polymeric microspheres which expand at a temperature of less than 250° C.
F47. The unified multilayer article of any of the preceding embodiments wherein the expanded polymeric microspheres comprise intact expanded polymeric microspheres and ruptured expanded polymeric microspheres in a ratio of greater than 2:1.
F48. The unified multilayer article of any of the preceding embodiments wherein the expanded polymeric microspheres comprise intact expanded polymeric microspheres and ruptured expanded polymeric microspheres in a ratio of greater than 4:1.
F49. The unified multilayer article of any of the preceding embodiments wherein the expanded polymeric microspheres comprise intact expanded polymeric microspheres and ruptured expanded polymeric microspheres in a ratio of greater than 9:1.
F50. The unified multilayer article of any of the preceding embodiments wherein the expanded polymeric microspheres comprise intact expanded polymeric microspheres and ruptured expanded polymeric microspheres in a ratio of greater than 19:1.
F51. The unified multilayer article of any of the preceding embodiments wherein the first elastomeric material is pressure sensitive adhesive (PSA) material.
F52. The unified multilayer article of any of the preceding embodiments wherein the first elastomeric material has a storage modulus at 1 Hz and room temperature of less than 0.3 MPa.
F53. The unified multilayer article of any of the preceding embodiments wherein the first elastomeric material is an acrylic PSA material.
F54. The unified multilayer article of any of the preceding embodiments wherein the first elastomeric material is a non-tackified acrylic PSA material.
F55. The unified multilayer article of any of the preceding embodiments wherein the first elastomeric material is a tackified acrylic PSA material.
F56. The unified multilayer article of any of the preceding embodiments wherein the first elastomeric material is a tackified rubber PSA material.
F57. The unified multilayer article of any of the preceding embodiments wherein the first elastomeric material is a tackified silicone PSA material.
F58. The unified multilayer article of any of the preceding embodiments wherein the alternate layer is a non-foamed layer.
F59. The unified multilayer article of any of embodiments F1-F57 wherein the alternate layer is a foamed layer.
F60. The unified multilayer article of any of the preceding embodiments wherein the alternate layer comprises the first elastomeric material.
F61. The unified multilayer article of any of the preceding embodiments wherein the alternate layer comprises a second elastomeric material not identical to the first elastomeric material.
F62. The unified multilayer article of any of embodiments F1-F59 wherein the alternate layer comprises a material that is not a pressure sensitive adhesive.
F63. The unified multilayer article of any of the preceding embodiments wherein the alternate layer has a Young's Modulus of greater than 0.9 MPa.
F64. The unified multilayer article of any of the preceding embodiments wherein the alternate layer has a Young's Modulus of greater than 1.2 MPa.
F65. The unified multilayer article of any of the preceding embodiments wherein the alternate layer has a Young's Modulus of greater than 2.0 MPa.
F66. The unified multilayer article of any of the preceding embodiments wherein the alternate layer has a Young's Modulus of greater than 4.0 MPa.
F67. The unified multilayer article of any of the preceding embodiments wherein the alternate layer has a Young's Modulus of greater than 6.0 MPa.
F68. The unified multilayer article of any of embodiments F1-F59 or F62-F67 wherein the alternate layer comprises polyurethane.
F69. The unified multilayer article of any of embodiments F1-F59 or F62-F67 wherein the alternate layer comprises polyolefin.
F70. The unified multilayer article of any of embodiments F1-F59 or F62-F67 wherein the alternate layer comprises polyethylene.

F71. The unified multilayer article of any of embodiments F1-F59 or F62-F70 wherein the alternate layer comprises a material having a melting point greater than 140° F. (60° C.).

F72. The unified multilayer article of any of embodiments F1-F59 or F62-F70 wherein the alternate layer comprises a material having a melting point greater than 150° F. (66° C.).

F73. The unified multilayer article of any of embodiments F1-F59 or F62-F70 wherein the alternate layer comprises a material having a melting point greater than 160° F. (71° C.).

F74. The unified multilayer article of any of embodiments F1-F59 or F62-F70 wherein the alternate layer comprises a material having a higher Young's modulus than the first elastomeric material.

F75. The unified multilayer article of any of embodiments F1-F59 or F62-F70 wherein the alternate layer comprises a material having a Young's modulus higher than that of the first elastomeric material by at least 1.0 MPa.

F76. The unified multilayer article of any of embodiments F1-F59 or F62-F70 wherein the alternate layer comprises a material having a Young's modulus higher than that of the first elastomeric material by at least 1.5 MPa.

F77. The unified multilayer article of any of embodiments F1-F59 or F62-F70 wherein the alternate layer comprises a material having a Young's modulus higher than that of the first elastomeric material by at least 2.0 MPa.

F78. The unified multilayer article of any of embodiments F1-F59 or F62-F70 wherein the alternate layer comprises a material having a Young's modulus higher than that of the first elastomeric material by at least 4.0 MPa.

F79. The unified multilayer article of any of the preceding embodiments wherein the ratio of the total weight of alternate layers to the total weight of elastomeric foam interior layers is greater than 0.26.

F80. The unified multilayer article of any of the preceding embodiments wherein the ratio of the total weight of alternate layers to the total weight of elastomeric foam interior layers is greater than 0.28.

F81. The unified multilayer article of any of the preceding embodiments wherein the ratio of the total weight of alternate layers to the total weight of elastomeric foam interior layers is greater than 0.30.

F82. The unified multilayer article of any of the preceding embodiments wherein the ratio of the total weight of alternate layers to the total weight of elastomeric foam interior layers is greater than 0.32.

F83. The unified multilayer article of any of the preceding embodiments wherein the ratio of the total weight of expanded microspheres in elastomeric foam interior layers to the total weight of first pressure sensitive material in elastomeric foam interior layers is greater than 0.035.

A1. An adhesive film comprising the unified multilayer article of any of embodiments F1-F83 and additionally comprising a first PSA attachment layer, which is an outermost PSA layer directly bound to a first face of the unified multilayer article and available for attachment of the adhesive film to an adherend.

A2. The adhesive film of embodiment A1 wherein the first PSA attachment layer has the same composition as an elastomeric foam interior layer of the unified multilayer article.

A3. The adhesive film of embodiment A1 wherein the first PSA attachment layer has the same composition as the first elastomeric material of an elastomeric foam interior layer of the unified multilayer article.

A4. The adhesive film of embodiment A1 wherein the first PSA attachment layer has a different composition from the elastomeric foam interior layers of the unified multilayer article.

A5. The adhesive film of embodiment A1, A3 or A4 wherein the first PSA attachment layer is a non-foam PSA layer.

A6. An adhesive film of any of embodiments A1-A5 additionally comprising a second PSA attachment layer, which is an outermost PSA layer directly bound to a second face of the unified multilayer article and available for attachment of the adhesive film to an adherend.

A7. The adhesive film of embodiment A6 wherein the second PSA attachment layer has the same composition as an elastomeric foam interior layer of the unified multilayer article.

A8. The adhesive film of embodiment A6 wherein the second PSA attachment layer has the same composition as the first elastomeric material of an elastomeric foam interior layer of the unified multilayer article.

A9. The adhesive film of embodiment A6 wherein the second PSA attachment layer has a different composition from the elastomeric foam interior layers of the unified multilayer article.

A10. The adhesive film of embodiment A6, A8 or A9 wherein the second PSA attachment layer is a non-foam PSA layer.

A11. The adhesive film of any of embodiments A1-A10 wherein the total number of elastomeric foam interior layers plus alternate layers plus PSA attachment layers is at least seven.

A12. The adhesive film of any of embodiments A1-A10 wherein the total number of elastomeric foam interior layers plus alternate layers plus PSA attachment layers is at least nine.

A13. The adhesive film of any of embodiments A1-A10 wherein the total number of elastomeric foam interior layers plus alternate layers plus PSA attachment layers is at least eleven.

A14. The adhesive film of any of embodiments A1-A10 wherein the total number of elastomeric foam interior layers plus alternate layers plus PSA attachment layers is at least thirteen.

A15. The adhesive film of any of embodiments A1-A10 wherein the total number of elastomeric foam interior layers plus alternate layers plus PSA attachment layers is at least fifteen.

A16. The adhesive film of any of embodiments A1-A15 having a thickness of less than 1000 microns.

A17. The adhesive film of any of embodiments A1-A15 having a thickness of less than 500 microns.

A18. The adhesive film of any of embodiments A1-A15 having a thickness of less than 300 microns.

A19. The adhesive film of any of embodiments A1-A15 having a thickness of less than 220 microns.

A20. The adhesive film of any of embodiments A1-A15 having a thickness of less than 190 microns.

A21. The adhesive film of any of embodiments A1-A15 having a thickness of less than 180 microns.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, Wis., or may be synthesized by known methods.

Materials

| | |
|---|---|
| AA | Monomer, Acrylic acid |
| EHA | Monomer, 2-ethyl hexyl acrylate |
| IBOA | Monomer, Isobornyl acrylate |
| IOTG | Chain transfer agent, Isooctyl thioglycolate |
| Irg1076 | Antioxidant; Octadecyl-3-(3,5-di-tert.butyl-4-hydroxyphenyl)-propionate, an antioxidant available under the trade designation IRGANOX 1076 available from BASF Corporation, Florham Park, NJ. |
| Irg1010 | Antioxidant; Pentaerythritoltetrakis(3-(3,5-ditertbutyl-4-hydroxyphenyl)propionate), an antioxidant available under the trade designation IRGANOX 1010 available from BASF Corporation, Florham Park, NJ. |
| Irg651 | Photoinitiator; 2-dimethoxy-2-phenylacetophenone, a photoinitiator available under the trade designation IRGACURE 651 from available from BASF Corporation, Florham Park, NJ. |
| F85 | Tackifier; A glycerol ester of highly hydrogenated refined wood rosin, available under the trade designation FORAL 85 from Pinova Corporation, Brunswick, GA. |
| P125 | Tackifier; A fully hydrogenated hydrocarbon resin, available under the trade designation ARKON P-125 from Arakawa Chemical, Chicago, IL. |
| K1161 | A styrene-isoprene-styrene triblock copolymer having an approximate styrene content of 15% and 19% diblock content, available under the trade designation KRATON D1161 P from Kraton Performance Polymers, Houston, TX. |
| E58213 | Thermoplastic polyurethane; Aromatic polyester-based thermoplastic polyurethane with a specified Shore A hardness of 75 by ASTM D-2240, corresponding to an estimated Young's modulus of 1.37 MPa, available under the trade designation ESTANE 58213 from Lubrizol, Wickliffe, OH. |
| E5701 | Thermoplastic polyurethane; A polyester-based thermoplastic polyurethane with a specified Shore A hardness of 85, corresponding to an estimated Young's modulus of 2.30 MPa, under the trade designation ESTANE 5701 from Lubrizol, Wickliffe, OH. |
| P1430 | An ethylene acrylic acid copolymer under the trade designation PRIMACOR 1430 from Dow Chemical Company, Midland, MI. |
| HDPE | An extrusion grade high density polyethylene (HDPE) under the trade designation DMDA-8810 NT 7 HIGH DENSITY POLYETHYLENE, from Dow Chemical Company, Midland, MI, with a specified Shore D hardness of 61, corresponding to an estimated Young's modulus of 6.31 MPa. |
| Test Panel 1 | Acrylic sheets with abrasive resistant coating cut to the dimensions of 3 mm (0.118 inch) × 50.8 mm (2 inches) × 101.6 mm (4 inches), available under the trade designation ACRYLITE AR from Evonik Corporation, Parisippany, NJ. |
| Release Liner 1 | A 0.003 in. (75 micrometer) thick polyester release liner having a different release coating on each side to provide a differential release. |
| Adhesive Transfer Tape 1 | 3M 9458 Transfer Tape, 0.001 in (25 micrometers) thick acrylic adhesive on a 0.003 in. (75 micrometer) thick polyester release liner having a different release coating on each side to provide a differential release. |
| DU20 | Heat-expandable polymeric microspheres consisting of a shell encapsulating a gas having an average pre-expansion particle diameter of 5 to 9 microns available under the trade designation EXPANCEL 920DU20 from AkzoNobel Corporation, Amsterdam, Netherlands. After expansion, average particle diameter is 20 microns. Specified as beginning expansion in the range between 120° C. (248° F.) and 145° C. (293° F.). |
| EcoP | A chemical blowing agent that releases carbon dioxide when heated above 201° C. (393° F.), available under the trade designation ECOCELL P from Polyfil Corporation, Rockaway, NJ. |

Test Methods

Density Measurements

The density of samples were measured using a Metler Toledo Density Kit on a Metler Toledo XP/XS Analytical Balance. Foam samples were folded two times, to create four-layer constructs. The four-layer constructs were cut into 25.5 mm (1 inch) by 25.5 mm (1 inch) squares. The density of the constructs were measured using a Metler Toledo Density Kit on a Metler Toledo XP/XS Analytical Balance according to manufacturer protocol. Three measurements were taken per example condition and the average density is reported.

Tensile Drop Test

Test Panel 1 was washed three times with isopropanol. Two strips of tape sample measuring 2 mm by 51 mm were applied lengthwise across the width of the underside cavity of a custom made aluminum test fixture having a weight of 143 grams such that they were 11.5 mm from the end walls of the cavity. The Test Panel 1 was centered within the cavity and in contact with the adhesive foam strips. The bonded article was then positioned with the cavity facing upward and a 4 kg (8.8 lb.) weight was placed on the exposed surface of Test Panel 1 for 15 seconds after which it was removed and the bonded article was allowed to dwell for 24 hours at 23° C. and 50% RH. The bonded article was then evaluated for drop resistance in a tensile mode using a drop tester (DT 202, available from Shinyei Corporation of America, New York, N.Y.) and a horizontal orientation of the bonded article with Test Panel 1 facing downward. The bonded article was dropped onto a 1.2 cm thick steel plate until failure starting at a height of 70 cm for 30 drops, then 120 cm for 30 additional drops, and finally 200 cm for 30 drops. Two samples were tested, the number of drops to failure was recorded for each, and the average number of drops to failure was reported. The method and drop assembly is described in U. S. Patent Pub. No. 2015/0030839.

TABLE 1

Components of acrylic copolymers (in parts by weight)

| Polymer | EHA | AA | IBOA | Irg1076 | Irg651 | IOTG |
|---|---|---|---|---|---|---|
| AC1 | 94 | 6 | | | 0.15 | |
| AC2 | 87.5 | 2.5 | 10 | | 0.15 | 0.005 |
| AC3 | | 3 | 97 | 0.2 | 1 | 0.75 |
| AC4 | 87.5 | 2.5 | 10 | 0.2 | 0.15 | 0.03 |
| AC5 | 95 | 5 | | | 0.15 | 0.03 |

As described in detail below, acrylic copolymers AC1-AC5 were used in compounding compositions Comp1-Comp7, which included the components presented in Table 2.

TABLE 2

Hotmelt extrusion compounded compositions (in weight percent)

| Composition | K1161 | AC1 | AC2 | AC3 | AC4 | AC5 | F85 | P125 | Irg1010 |
|---|---|---|---|---|---|---|---|---|---|
| Comp1 | 35.32 | 35.32 | | | | | 28.34 | | 1.02 |
| Comp2 | | | 64.80 | 19.50 | | | | 15.70 | |
| Comp3 | 72.00 | | | | | | 28 | | |
| Comp4 | | | 72.00 | | | | 28 | | |
| Comp5 | 72 | | | | | | | 28 | |
| Comp6 | | | | | | 100 | | | |
| Comp7 | | | | 19.50 | 64.80 | | | 15.70 | |

Shrinkage Testing

Non-electron irradiated tapes on Release Liner 1 were cut into a 101.6 mm (4 inch) by 101.6 mm (4 inch) square. The square sample was folded four times in the cross-web direction while maintaining one side of the tape bound to Release Liner 1. The folding procedure results in a rectangular shaped sample with a 101.6 mm (4 inch) length in the down-web direction and roughly a 6.35 mm (0.25 inch) width in the cross-web direction. The rectangular sample was removed from Release Liner 1 and placed in a dry heat oven at 48.9° C. (120° F.) and incubated for 24 hours. Next, the sample was removed from the oven, and the subsequent down-web length of the samples was measured using a caliper gauge (available from Fowler). The resulting percent change in length from the initial 4 inches was recorded for each sample. Two samples were tested for each tape example and the average percent shrinkage was reported.

Preparation of Acrylic Copolymers

Acrylic copolymers AC1-AC5 were prepared having the compositions shown in Table 1. For the copolymer, the components in the amounts shown in Table 1 were mixed in amber bottles. Approximately 26 grams of the mixture were placed in a 18 cm×5 cm clear heat sealable poly(ethylene vinyl acetate) bag obtained under the trade designation VA-24 from Flint Hills Resources; Wichita, Kans. Air was forced out of the open end and the bag was sealed using an impulse heat sealer (Midwest Pacific Impulse Sealer; J.J. Elemer Corp.; St. Louis, Mo.). The sealed bags were immersed in a constant temperature water bath at 17° C. and irradiated with ultraviolet light (365 nm, 4 mW/cm$^2$) for eight minutes on each side to produce the acrylic copolymer. The method of forming the packages and curing are described in Example 1 of U.S. Pat. No. 5,804,610, the subject matter of which is incorporated herein by reference in its entirety.

Preparation of Samples

Examples 1-11 and Comparative Examples C1 & C2

Examples 1-11 and Comparative Examples C1 & C2 were multilayer samples having an B(AB)$_x$ construction. For all samples, a melt stream Layer A was compounded using a 25 mm co-rotating twin screw extruder (available from Berstorff) having the formulation of Comp1, found in Table 2, and metered using a gear pump (available from Colfax). Melt stream Layer A was compounded according to the following procedure, using the throughputs shown in Table 3. K1161 and Irg1010 were dry fed into the first zone of the 25 mm co-rotating twin screw extruder. Using a roll-feed extruder (available from Berstorff), AC1 was heated and fed into the third zone of the Layer A twin screw extruder. Tackifier resin, F85, was heated and fed into the fourth zone of the extruder for Layer A using a gridmelter (available from Dynatec). DU20 expandable microspheres were fed into the eighth zone of extruder for Layer A, with the throughputs found in Table 3. Melt stream Layer B, having resin with the composition listed in Table 3, was melted and extruded using a 1¼ inch single screw extruder (available from Killion) and metered using a gear pump (available from Colfax). Similarly, examples containing EcoP as designated in Table 3 were dry-mixed with the specified resin and fed into the hopper of the extruder for Layer B. Extrudate streams of Layers A and B were merged to form a multilayer melt stream using a multilayer feedblock with the number of layers shown in Table 3. The overall number of layers was determined by the number of melt channels within the feedblock (multilayer feedblocks are available from Nortdson and/or Cloeron). The multilayer stream was passed through a single layer die and cast onto Release Liner 1 to a thickness of 100 micron (4 mil). Samples were taken from near the center of the cast multilayer film.

which can be used to adjust the density of the constructions. The throughput of non-foamed layer B can also be used to

TABLE 3

Multilayer Foam Examples 1-11, Comparative Examples C1 & C2

| | Layer A | | | Layer B | | | | Overall | |
|---|---|---|---|---|---|---|---|---|---|
| Ex | Material | Kg/hr (lbs/hr) | Foam Agent | Foam, Kg/hr (lbs/hr) | Material | Kg/hr (lbs/hr) | Foam Agent | Foam, pph | # of layers | Density (g/cm³) |
| C1 | Comp 1 | 4.54 (10) | DU20 | 0 | E58213 | 4.54 (10) | | | 5 | 1.000 |
| C2 | Comp 1 | 6.80 (15) | DU20 | 0 | E58213 | 2.27 (5) | | | 5 | 1.000 |
| 1 | Comp 1 | 4.54 (10) | DU20 | 0.068 (0.15) | E58213 | 5.54 (10) | | | 5 | 0.953 |
| 2 | Comp 1 | 6.80 (15) | DU20 | 0.045 (0.1) | E58213 | 2.27 (5) | | | 5 | 0.922 |
| 3 | Comp 1 | 6.80 (15) | DU20 | 0..091 (0.2) | E58213 | 2.27 (5) | | | 5 | 0.853 |
| 4 | Comp 1 | 6.80 (15) | DU20 | 0.045 (0.1) | E5701 | 2.27 (5) | | | 13 | 1.000 |
| 5 | Comp 1 | 6.80 (15) | DU20 | 0.045 (0.1) | E5701 | 2.27 (5) | | | 13 | 0.956 |
| 6 | Comp 1 | 6.80 (15) | DU20 | 0.136 (0.3) | E58213 | 3.40 (7.5) | EcoP | 2 | 5 | 0.7799 |
| 7 | Comp 1 | 6.80 (15) | DU20 | 0.136 (0.3) | E58213 | 2.27 (5) | | | 5 | 0.7706 |
| 8 | Comp 1 | 6.80 (15) | DU20 | 0.136 (0.3) | E58213 | 1.36 (3) | | | 5 | 0.7645 |
| 9 | Comp 1 | 6.80 (15) | DU20 | 0.045 (0.1) | P1430 | 5.54 (10) | | | 5 | 0.9215 |
| 10 | Comp 1 | 6.80 (15) | DU20 | 0.045 (0.1) | P1430 | 2.27 (5) | | | 5 | 0.8851 |
| 11 | Comp 1 | 6.80 (15) | DU20 | 0.136 (0.3) | P1430 | 1.36 (3) | | | 5 | 0.7082 |

Examples 1-11 demonstrate $B(AB)_x$ multilayer constructions made with varying material compositions, throughputs, foaming strategies and number of layers. The amount of foaming agent in Layer A can be varied broadly, which can be used to adjust the density of the constructions. The throughput of non-foamed layer B can also be used to increase or reduce overall construction density. In some embodiments, both Layer A and Layer B can be foamed to achieve even lower densities. The layer throughputs (e.g., Layer A, Layer B) can be adjusted to control individual layer thickness within the overall tape construction. Comparative Examples C1 and C2 lacked foaming agent in layer A.

Examples 12-17 and Comparative Example C3

Examples 12-17 and Comparative Example C3 were made according to the procedure for Examples 1-11, with the following modifications: Multilayer examples were made with an $A(BA)_x$ construction with compounded formulations shown in Table 2, and layer throughputs and the number of layers shown in Table 4.

increase or reduce overall construction density. In some embodiments, both Layer A and Layer B can be foamed to achieve even lower densities. The layer throughputs (e.g., Layer A, Layer B) can be adjusted to control individual layer thickness within the overall tape construction. Comparative Example C3 lacked foaming agent in layer A.

Examples 18-29 and Comparative Examples C4-C6

Examples 18-29 and Comparative Examples C4-C6 were multilayer samples having an $B(AB)_x$ core construction with outer coextruded PSA skins added to make a PSA-$B(AB)_x$-PSA construction, where the total number of layers is 3+2x. For all samples, melt stream Layer A was compounded using a 26 mm co-rotating twin screw extruder (available from Coperian) with the compositions shown in Table 2 and metered using a gear pump (available from Colfax). Melt stream Layer A was compounded according to the following procedure, with throughputs shown in Table 5. Pellet resins and powders (e.g., K1161 and Irg1010) were dry fed into the first zone of the twin screw extruder. Using

TABLE 4

Multilayer Foam Examples 12-17 and Comparative Example C3

| | Layer A | | | Layer B | | | | Overall | |
|---|---|---|---|---|---|---|---|---|---|
| Ex | Material | Kg/hr (lbs/hr) | Foam Agent | Foam Kg/hr (lbs/hr) | Material | Kg/hr (lbs/hr) | Foam Agent | Foam, pph | # of layers | Density (g/cm³) |
| 12 | Comp1 | 10.30 (22.7) | DU20 | 0.091 (0.20) | P1430 | 1.81 (4) | | | 13 | 0.6858 |
| 13 | Comp1 | 10.30 (22.7) | DU20 | 0.181 (0.40) | P1430 | 1.81 (4) | | | 13 | 0.8979 |
| 14 | Comp1 | 10.30 (22.7) | DU20 | 0.181 (0.40) | P1430 | 2.49 (5.5) | | | 13 | 0.9073 |
| 15 | Comp1 | 10.30 (22.7) | DU20 | 0.181 (0.40) | HDPE | 5.35 (11.8) | | | 13 | 0.8861 |
| 16 | Comp1 | 10.43 (23) | DU20 | 0.181 (0.40) | HDPE | 2.49 (5.5) | | | 13 | 0.7792 |
| 17 | Comp1 | 10.89 (24) | DU20 | 0.181 (0.40) | HDPE | 2.49 (5.5) | EcoP | 2 | 13 | 0.8457 |
| C3 | Comp1 | 10.89 (24) | | | HDPE | 2.49 (5.5) | EcoP | 2 | 13 | 0.9590 |

Examples 12-17 demonstrates $A(BA)_x$ multilayer constructions made with varying material compositions, throughputs, foaming strategies and number of layers. The amount of foaming agent in Layer A can be varied broadly, a roll-feed extruder (available from Berstorff), acrylic copolymers (e.g., AC1) were heated and fed into the second zone of the Layer A twin screw extruder. Tackifier resins (e.g., F85 and P125) were heated and fed into the third zone of the extruder for Layer A using a gridmelter (available from Dynatec). DU20 expandable microspheres were dry fed into the ninth zone of the extruder for Layer A, with the throughputs found in Table 5.

For all samples, melt stream Layer B was compounded using 25 mm co-rotating twin screw extruder (available from Berstorff), using the compositions shown in Table 2, and metered using a gear pump (available from Colfax). Melt stream Layer B was compounded according to the following procedure with throughputs shown in Table 5. Pellet resins and powders (e.g., E58213, P1430, HDPE) were dry fed into the first zone of the twin screw extruder. Using a roll-feed extruder (available from Berstorff), acrylic copolymers (e.g., AC1, AC5) were heated and fed into the first zone of the Layer B twin screw extruder. Tackifier resins (e.g., F85 and P125) were heated and fed into the second zone of the extruder for Layer B using a gridmelter (available from Dynatec).

The PSA skin melt stream was compounded using 25 mm co-rotating twin screw extruder (available from Berstorff) with the compositions shown in Table 2. The PSA melt stream was compounded according to the following procedure, with throughputs shown in Table 5. Using a roll-feed extruder (available from Berstorff), acrylic copolymers (e.g., AC2) was heated and fed into the first zone of the PSA twin screw extruder. Tackifier resins (e.g., P125) and acrylic copolymer AC3 were heated and fed into the second and third zones of the extruder for the PSA skins, respectively, using gridmelters (available from Dynatec). The compounded PSA melt stream leaving the twin screw extruders, was split evenly into two streams and metered using two gear pumps (available from Colfax).

Tape samples were prepared by coextruding a first skin PSA melt layer, a multilayer core as the middle layer, and a second PSA melt layer. The multilayer $B(AB)_x$ cores were formed by merging Layers A and B using a multi-layer feedblock. The overall number of core layers was determined by the number of melt channels within the feedblock (multilayer feedblocks available from Cloeren). The first and second PSA melt streams were fed through the outer layers of a three-layer multi-manifold film die (available from Cloeren). The multilayer core was fed into the center layer of the three layer die. Upon exiting the die, the co-extruded tapes were cast onto Release Liner 1 with a 150 micron (6 mil) thickness. Samples were taken from near the center of the cast multilayer film.

Comparative Examples C4-C6 lacked foaming agent in layer A.

TABLE 5

Co-Extruded Multilayer Foam Tapes, Examples 18-29 and Comparative Examples C4-C6

| | PSA Skins | | Layer A | | | Foam, | Layer B | | Overall | |
|---|---|---|---|---|---|---|---|---|---|---|
| Ex | Material | Kg/hr (lbs/hr) | Material | Kg/hr (lbs/hr) | Foam Agent | Kg/hr (lbs/hr) | Material | Kg/hr (lbs/hr) | # of layers | Density (g/cm³) |
| C4 | Comp2 | 9.07 (20) | Comp1 | 13.61 (30) | | | E58213 | 4.53 (10) | 7 | 0.9764 |
| C5 | Comp2 | 9.07 (20) | Comp1 | 13.61 (30) | | | E58213 | 4.53 (10) | 15 | 1.000 |
| C6 | Comp2 | 9.07 (20) | Comp5 | 9.07 (20) | | | Comp6 | 9.07 (20) | 15 | 0.9695 |
| 18 | Comp2 | 9.07 (20) | Comp1 | 13.61 (30) | DU20 | 0.204 (0.45) | E58213 | 4.53 (10) | 7 | 0.938 |
| 19 | Comp2 | 9.07 (20) | Comp1 | 13.61 (30) | DU20 | 0.272 (0.60) | E58213 | 6.80 (15) | 7 | 0.9671 |
| 20 | Comp2 | 9.07 (20) | Comp1 | 13.61 (30) | DU20 | 0.340 (0.75) | E58213 | 4.53 (10) | 7 | 0.9289 |
| 21 | Comp2 | 10.21 (22.5) | Comp1 | 13.61 (30) | DU20 | 0.272 (0.60) | E58213 | 6.80 (15) | 7 | 0.9453 |
| 22 | Comp2 | 11.34 (25) | Comp1 | 13.61 (30) | DU20 | 0.272 (0.60) | E58213 | 9.07 (20) | 7 | 0.9564 |
| 23 | Comp2 | 8.16 (18) | Comp1 | 13.61 (30) | DU20 | 0.272 (0.60) | E58213 | 2.72 (6) | 7 | 0.9173 |
| 24 | Comp2 | 9.07 (20) | Comp1 | 13.61 (30) | DU20 | 0.272 (0.60) | P1430 | 4.53 (10) | 7 | 0.9153 |
| 25 | Comp2 | 9.07 (20) | Comp1 | 13.61 (30) | DU20 | 0.272 (0.60) | P1430 | 4.53 (10) | 15 | 0.9251 |
| 26 | Comp2 | 9.07 (20) | Comp1 | 13.61 (30) | DU20 | 0.272 (0.60) | E58213 | 4.53 (10) | 15 | 0.955 |
| 27 | Comp2 | 9.07 (20) | Comp1 | 13.61 (30) | DU20 | 0.204 (0.45) | E58213 | 4.53 (10) | 15 | 0.9657 |
| 28 | Comp2 | 9.07 (20) | Comp3 | 9.07 (20) | DU20 | 0.272 (0.60) | Comp4 | 9.07 (20) | 15 | 0.9763 |
| 29 | Comp2 | 9.07 (20) | Comp5 | 9.07 (20) | DU20 | 0.181 (0.40) | Comp6 | 9.07 (20) | 15 | 0.9598 |

Examples 18-29 demonstrate tapes consisting of co-extruded $B(AB)_x$ multilayer cores with outer PSA skins.

FIG. 1 is a micrograph of a cross-section of the adhesive film 110 of Ex. 19, with a scale bar indicating 100 microns. It can be seen that 5-layer multilayer film 120 had a thickness of 129 microns. The inclusion of two PSA skin layers 130 and 131 made an adhesive film 110 having a total thickness of 171 microns. PSA foam internal layers 140 and 141 (thicknesses 40 and 60 microns) alternated with thermoplastic polyurethane alternate layers 150, 151 and 152 (thicknesses 7, 14 and 7 microns) to make up unified 5-layer multilayer film 120. PSA foam internal layers 140 and 141 included expanded polymeric microspheres 160. It can be seen that most if not all of the expanded polymeric microspheres visible in the cross-section are unbroken (other than by the cross-sectioning process itself).

Figure 2:
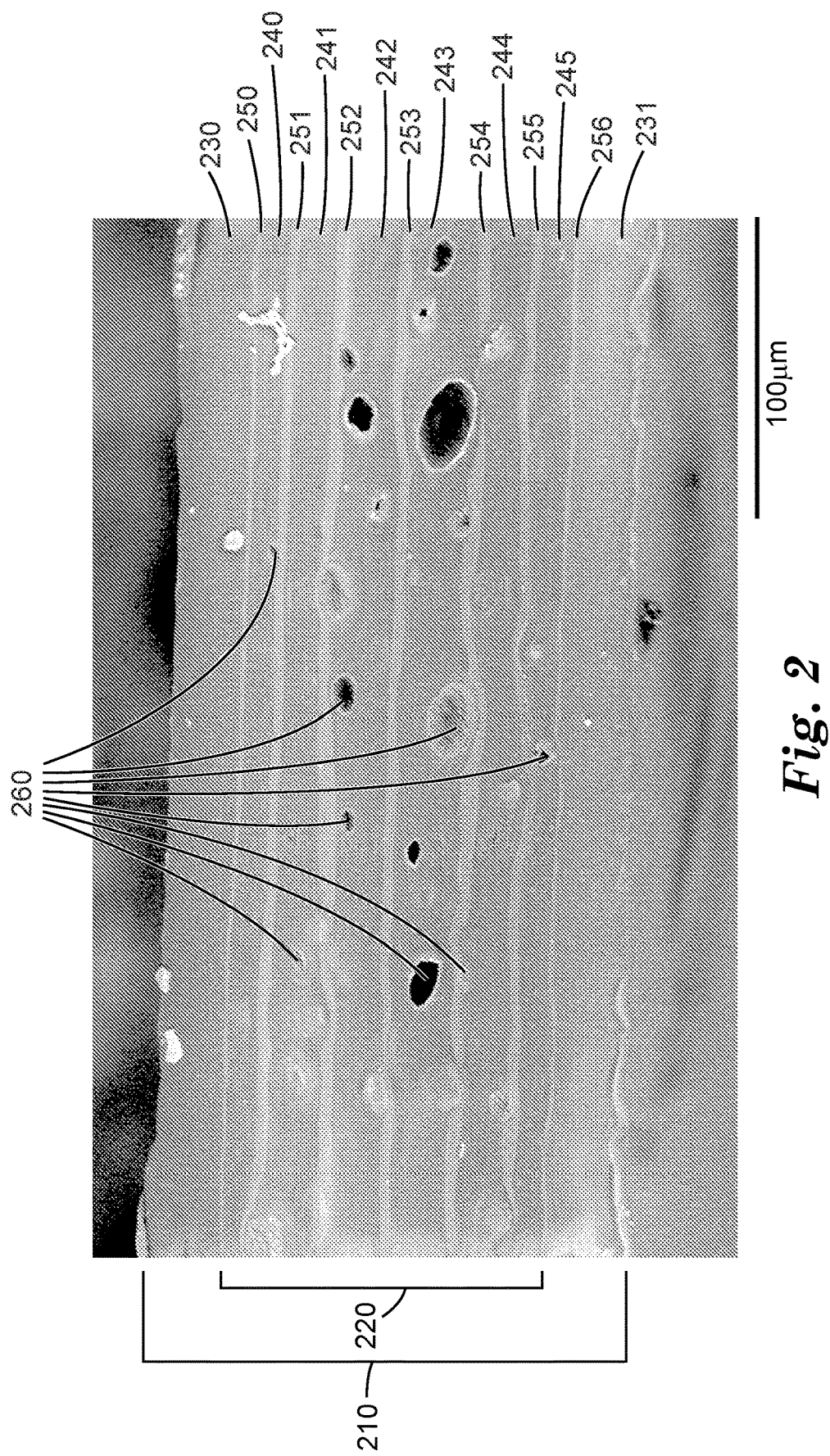
FIG. 2 is a micrograph of a cross-section of an adhesive film comprising a 13-layer multilayer film, according to one embodiment of the present disclosure, described herein as Ex. 26, with a scale bar indicating 100 microns.

FIG. 2 is a micrograph of a cross-section of the adhesive film 210 of Ex. 26, with a scale bar indicating 100 microns. It can be seen that 13-layer multilayer foam film 220 had a thickness of 112 microns. The inclusion of two PSA skin layers 230 and 231 made an adhesive film 210 having a total thickness of 164 microns. PSA foam internal layers 240, 241, 242, 243 and 245 (thickness vary from 10 to 21 microns) alternated with thermoplastic polyurethane alternate layers 250, 251, 252, 253, 254, 255 and 256 (thicknesses vary from 2 to 5 microns) to make up unified 13-layer multilayer film 220. PSA foam internal layers 240, 241, 242, 243 and 245 included expanded polymeric microspheres 260 which are unbroken. It can be seen that most if not all of the expanded polymeric microspheres visible in the cross-section are unbroken (other than by the cross-sectioning process itself).

Examples 18-29 demonstrate tapes with varying material compositions, throughputs, foaming strategies and number of layers. The amount of foaming agent in Layer A can be varied broadly, which can be used to adjust the density of the constructions. The throughput of non-foamed layer B can also be used to increase or reduce overall construction density. The layer throughputs (e.g., Layer A, Layer B, PSA Layer 1, PSA Layer 2) can be adjusted to control individual layer thickness within the overall tape construction.

Examples 30-34 and Comparative Example 7

Examples 30-34 and Comparative Example 7 were made according to the procedure for Examples 18-29, with the following modifications: Multilayer cores were made with an $A(BA)_x$ construction with compounded formulations shown in Table 2, using the layer throughputs and the number of layers shown in Table 6. A second Release Liner 1 was laminated on the open PSA side of the coextruded multilayer foam tape, resulting in tapes with liners on both sides. All of the co-extruded multilayer foam tapes were exposed to e-beam radiation on each side using an ELECTROCURTAIN CB-300 e-beam unit (Energy Sciences Incorporated, Wilmington, Mass.) at an accelerating voltage of 250 Kiloelectron Volts, and a dose of 6 MegaRads, per side.

Comparative Example C7 lacked foaming agent in layer A.

Results

TABLE 8

Tensile drop and shrinkage measurements

| Example | Drops at 70 cm | Drops at 120 cm | Total Drops to Failure | Shrinkage (%) |
|---|---|---|---|---|
| 30 | 30 | 2.5 | 32.5 | 2.8 |
| C7 | 3 | | 3 | 4.0 |
| 31 | 7 | | 7 | 3.9 |
| 32 | 15 | | 15 | 4.4 |
| 33 | 25.5 | 2 | 27.5 | 5.3 |
| 34 | 30 | 10 | 40 | 0.3 |
| C8 | 30 | 13 | 43 | 6.0 |

Examples 30-34 demonstrate tapes consisting of co-extruded $A(BA)_x$ multilayer cores with outer PSA skins. These examples demonstrate tapes made with varying material compositions, throughputs, foaming strategies and number of layers. The amount of foaming agent in Layer A can be varied broadly, which can be used to adjust the density of the

TABLE 6

Co-Extruded Multilayer Foam Tapes, Examples 30-34 and Comparative Example C7

| | PSA Skins | | Layer A | | | | Layer B | | Overall |
| | | | | | Foam, | | | | |
| Ex | Material | Kg/hr (lbs/hr) | Material | kg/hr (lbs/hr) | Foam Agent | Kg/hr (lbs/hr) | Material | Kg/hr (lbs/hr) | # of layers | Density (g/cm³) |
|---|---|---|---|---|---|---|---|---|---|---|
| 30 | Comp7 | 9.07 (20) | Comp1 | 13.61 (30) | DU20 | 0.454 (1) | HDPE | 2.72 (6) | 15 | 0.9498 |
| C7 | Comp7 | 9.07 (20) | Comp1 | 13.61 (30) | DU20 | 0 | P1430 | 4.53 (10) | 15 | 0.9483 |
| 31 | Comp7 | 9.07 (20) | Comp1 | 13.61 (30) | DU20 | 0.272 (0.6) | P1430 | 4.53 (10) | 15 | 0.9691 |
| 32 | Comp7 | 9.07 (20) | Comp1 | 13.61 (30) | DU20 | 0.408 (0.9) | P1430 | 3.63 (8) | 15 | 0.8000 |
| 33 | Comp7 | 9.07 (20) | Comp1 | 13.61 (30) | DU20 | 0.544 (1.2) | P1430 | 2.72 (6) | 15 | 0.7921 |
| 34 | Comp7 | 9.07 (20) | Comp1 | 13.61 (30) | DU20 | 0.544 (1.2) | E58213 | 4.53 (10) | 15 | 0.9237 |

Comparative Example C8

Example C8 was a three layer tape comprising a single foam core layer with outer PSA skins. The single foam core layer was prepared as described for Layer A in Examples 1-11, using the throughputs shown in Table 7, and with the following modifications. The compounded core melt stream was fed directly into a single layer die and coated on Release Liner 1 to a 100 micron (4 mil) thickness. Subsequently, Release Liner 1 was removed from the foam sample and Adhesive Transfer Tape 1 was laminated to both sides, resulting in a three layer foam tape construction. The three layer sample was exposed to e-beam radiation on each side using an ELECTROCURTAIN CB-300 e-beam unit (Energy Sciences Incorporated, Wilmington, Mass.) at an accelerating voltage of 250 Kiloelectron Volts, and a dose of 4 MegaRads, per side.

TABLE 7

Single-Foamed-Layer Tape

| Ex | Material | Kg/hr (lbs/hr) | Foam Agent | Foam, Kg/hr (lbs/hr) | Density (g/cm³) |
|---|---|---|---|---|---|
| C8 | Comp1 | 4.54 (10) | DU20 | 0.136 (0.3) | 0.8238 | constructions. The throughput of non-foamed layer B can also be used to increase or reduce overall construction density. The layer throughputs (e.g., Layer A, Layer B, PSA Layer 1, PSA Layer 2) can be adjusted to control individual layer thickness within the overall tape construction.

Comparison of and Comparative Examples C8 to Examples 30-34 demonstrates that the addition of multiple stiff thermoplastic resin in the core can improve convertibility and handlability of tapes as measured through a lower percent shrinkage, while simultaneously having the ability to maintain impact resistance, as measured via tensile drop (Table 8). For example, comparison of Example 34 to C8 demonstrates that shrinkage can be reduced by one or more orders of magnitude while maintaining or improving impact resistance. Furthermore, the presence of additional multilayers can improve convertibility, provide internal barriers to component migration, provide a primer layer for bonding or tape modifications, provide rigid layers to improve holding power, and reduce the need for or eliminate expensive cross-linking strategies.

Adhesive films according to the present disclosure demonstrate good to excellent convertibility.

Various modifications and alterations of this disclosure will become apparent to those skilled in the art without departing from the scope and principles of this disclosure, and it should be understood that this disclosure is not to be unduly limited to the illustrative embodiments set forth hereinabove.

I claim:

1. A unified multilayer article comprising alternating layers including:
   A. at least two elastomeric foam interior layers, which are interior layers of the unified multilayer article, and which comprise:
      i) a first elastomeric material, and distributed therein
      ii) expanded polymeric microspheres;
   the elastomeric foam interior layers alternating with
   B. at least two alternate layers directly bound to adjacent elastomeric foam interior layers without any intervening matter between the adjacent layers;
   wherein at least one of the alternate layers is an interior layer of the unified multilayer article; and further wherein the total number of alternating elastomeric foam interior layers and alternate layers is at least five.

2. The unified multilayer article of claim 1, wherein the multilayer article is prepared using multilayer melt extrusion.

3. The unified multilayer article of claim 1, wherein the total number of alternating elastomeric foam interior layers and alternate layers is at least eleven.

4. The unified multilayer article of claim 1, wherein alternate layers have an average thickness and elastomeric foam interior layers have an average thickness at least 2 times greater than the alternate layer average thickness.

5. The unified multilayer article of claim 1, wherein elastomeric foam interior layers have a thickness of not more than 100 microns.

6. The unified multilayer article of claim 1, wherein elastomeric foam interior layers have a thickness of not more than 30 microns.

7. The unified multilayer article of claim 1 wherein the expanded polymeric microspheres have an average diameter of not more than 22 microns.

8. The unified multilayer article of claim 1 wherein the alternate layers comprise a polymer selected from the group of a polyurethane, a polyester, a poly(meth)acrylate, a polyolefin, and a combination thereof.

9. The unified multilayer article of claim 8 wherein the alternate layers comprise a polymer selected from the group of a polyurethane, a polyolefin, and a combination thereof.

10. The unified multilayer article of claim 1 wherein the ratio of the total weight of alternate layers to the total weight of elastomeric foam interior layers is greater than 0.26.

11. The unified multilayer article of claim 1, wherein one or more of the elastomeric foam interior layers comprise a styrene-containing block copolymer.

12. The unified multilayer article of claim 11, wherein one or more of the elastomeric foam interior layers comprise a styrene-containing block copolymer in an amount of at least 35 wt-%, based on total amount of compounded composition.

13. The unified multilayer article of claim 1, wherein the alternate layers do not include expanded polymeric microspheres.

14. The unified multilayer article of claim 13, wherein the alternate layers are non-foamed layers.

15. The unified multilayer article of claim 1, wherein the alternate layers comprise the first elastomeric material.

16. The unified multilayer article of claim 1, wherein the alternate layers comprise a second elastomeric material not identical to the first elastomeric material.

17. The unified multilayer article of claim 1, wherein the outermost alternate layers are PSA layers.

18. An adhesive film comprising the unified multilayer article of claim 1 and additionally comprising a first PSA attachment layer, which is an outermost PSA layer directly bound to a first face of the unified multilayer article and available for attachment of the adhesive film to an adherend.

19. The adhesive film of claim 18 wherein the first PSA attachment layer has the same composition as the first elastomeric material of an elastomeric foam interior layer of the unified multilayer article.

20. The adhesive film of claim 18 wherein the first PSA attachment layer has a different composition from the elastomeric foam interior layers of the unified multilayer article.

21. An adhesive film of claim 18 additionally comprising a second PSA attachment layer, which is an outermost PSA layer directly bound to a second face of the unified multilayer article and available for attachment of the adhesive film to an adherend.

22. The adhesive film of claim 18 having a thickness of less than 190 microns.

* * * * *